(12) United States Patent
Saruta

(10) Patent No.: US 9,390,586 B2
(45) Date of Patent: Jul. 12, 2016

(54) VIDEO GAME APPARATUS, PROGRAM, AND CONTROL METHOD FOR VIDEO GAME APPARATUS

(75) Inventor: Masayuki Saruta, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 163 days.

(21) Appl. No.: 14/002,291

(22) PCT Filed: Apr. 19, 2012

(86) PCT No.: PCT/JP2012/060600
§ 371 (c)(1),
(2), (4) Date: Aug. 29, 2013

(87) PCT Pub. No.: WO2013/008507
PCT Pub. Date: Jan. 17, 2013

(65) Prior Publication Data
US 2013/0337901 A1    Dec. 19, 2013

(30) Foreign Application Priority Data
Jul. 12, 2011 (JP) .................. 2011-153459

(51) Int. Cl.
*G07F 17/32* (2006.01)
*A63F 13/40* (2014.01)
*A63F 13/00* (2014.01)

(52) U.S. Cl.
CPC .......... *G07F 17/3244* (2013.01); *A63F 13/005* (2013.01); *A63F 13/10* (2013.01); *G07F 17/3297* (2013.01)

(58) Field of Classification Search
CPC . G07F 17/3297; G07F 17/32; G07F 17/3262; A63F 2250/136; A63F 7/0005
See application file for complete search history.

(56) References Cited

U.S. PATENT DOCUMENTS

| | | | | |
|---|---|---|---|---|
| 5,752,699 A | * | 5/1998 | Crompton et al. | 273/138.2 |
| 7,267,615 B2 | * | 9/2007 | Rodden et al. | 463/30 |
| 7,311,304 B1 | * | 12/2007 | Kelly | 273/138.3 |

(Continued)

FOREIGN PATENT DOCUMENTS

| | | |
|---|---|---|
| CN | 101340956 A | 1/2009 |
| JP | 2007-175216 A | 7/2007 |

(Continued)

OTHER PUBLICATIONS

"Coin Dozer, iPhone Application" [online] found on Jul. 12, 2011, on the internet (URL: http://www.youtube.com/watch?v=jftTWt_g0vk).

(Continued)

*Primary Examiner* — Jay Liddle
*Assistant Examiner* — Alex F. R. P. Rada, II
(74) *Attorney, Agent, or Firm* — Sughrue Mion, PLLC

(57) ABSTRACT

In a video game apparatus, a game picture that shows conditions of plural token coins on a field and a pusher table, and a token coin array picture that shows in line plural token coins that are able to be fed to the field, are displayed in a viewing area. If a position of a touch operation detected by the detector lies on the token coin array picture, a processor in the video game apparatus determines a number of the token coins to be fed based on the position of the touch operation and feeds the number being determined of the token coins to the field.

7 Claims, 11 Drawing Sheets

(56) References Cited

U.S. PATENT DOCUMENTS

| | | |
|---|---|---|
| 8,157,645 B1 * | 4/2012 | Kelly .............................. 463/27 |
| 2002/0098880 A1 * | 7/2002 | Rodden et al. .................... 463/2 |
| 2005/0107166 A1 | 5/2005 | Ueshima et al. |
| 2009/0098942 A1 | 4/2009 | Fukuda et al. |
| 2013/0084934 A1 * | 4/2013 | Young .............................. 463/16 |

FOREIGN PATENT DOCUMENTS

| | | | |
|---|---|---|---|
| JP | 2008-245869 A | 10/2008 |
| JP | 2009-082744 A | 4/2009 |
| JP | 2010-188207 A | 9/2010 |

OTHER PUBLICATIONS

International Search Report for PCT/JP2012/060600 dated Jun. 26, 2012.

Communication dated Nov. 3, 2014 from the State Intellectual Property Office of the People's Republic of China in counterpart application No. 201280013682.9.

* cited by examiner

VIDEO GAME APPARATUS, PROGRAM, AND CONTROL METHOD FOR VIDEO GAME APPARATUS

CROSS REFERENCE TO RELATED APPLICATIONS

This application is a National Stage of International Application No. PCT/JP2012/060600 filed Apr. 19, 2012, claiming priority based on Japanese Patent Application No. 2011-153459, filed Jul. 12, 2011, the contents of all of which are incorporated herein by reference in their entirety.

TECHNICAL FIELD

The present invention relates to video game apparatuses, programs, and methods for video game apparatuses, and in particular, relates to a so-called "video pusher game" in which a pusher game is executed in a video game.

BACKGROUND ART

There is game software in which a pusher game is executed in a video game (see Non-Patent Document 1 for example). The game software is equipped with a physics calculation engine and simulates movements of a pusher table and respective locations of token coins on a field using physics calculations so as to produce a game picture. The game software is also equipped with a token coin feed function based on a touch interface, in which one can instruct the feeding of a token coin by tapping a display.

CITATION LIST

Non-Patent Document

Non-Patent Document 1: "Coin Dozer iPhone (registered trademark) application", [online], found on Jul. 12, 2011, on the Internet (URL: http://www.youtube.com/watch?v=jftTWt_g0vk)

SUMMARY OF INVENTION

Technical Problem

One can feed multiple token coins at one time after waiting for the best moment into a real pusher game machine located in a game arcade and the like. In contrast, in the game software shown in Non-Patent Document 1, one can only feed a single token coin by a single tapping, and cannot feed multiple token coins at one time. Furthermore, if one would like to feed as many token coins at the same time as possible, it is necessary to tap many times on the display at very short intervals, which is inconvenient. In addition, there is a problem that one cannot feed all token coins in an intended time period since the time period ends before one finishes tapping on the display.

This invention has been made in light of the above-described circumstances. A problem to be solved is to appropriately facilitate an instruction relevant to feeding token coins with a small number of touch operations so as to improve operability of a video pusher game.

Solution to Problem

In accordance with an aspect of the present invention, a video game apparatus for executing as a video game a pusher game played by feeding a token coin to a field provided with a pusher table on which plural token coins are placed and that gives reciprocal movement, includes: a viewing area; a processor for executing game processes of the pusher game; a game picture viewing unit for displaying a game picture that shows conditions of the plural token coins on the field and the pusher table in the viewing area according to a processing result by the processor; a token coin picture viewing unit for displaying a token coin array picture that shows in line plural token coins which are able to be fed to the field in the viewing area; and a detector for detecting one or more positions of one or more touch operations on the viewing area. The processor determines a number of token coins to be fed to the field out of the plural token coins which are able to be fed based on the position of the touch operation on the token coin array picture and feeds the number being determined of the token coins to the field, if the position of the touch operation detected by the detector lies on the token coin array picture.

The pusher table may give reciprocal movement at a constant moving speed, or may give reciprocal movement with changing its moving speed. The field may be configured to include a top surface of the pusher table, or may be configured without the top surface of the pusher table. A maximum number of token coin array members can be configured to be any number being equal to or greater than 2. The token coin array picture is not limited to show token coins that are able to be fed to the field in a single line, but may show token coins in plural lines. For instance, the token coin array picture MP2 as shown in FIG. 16 may show the plural token coins which are able to be fed to the field in two lines. The touch operation may be carried out by a finger or using a touch pen. The video game apparatus may be an electronic device with a touch input function, for instance, a smartphone, a tablet computer, a notebook personal computer, a handheld gaming device, etc. Alternatively, the video game apparatus may be constructed with a main unit of a personal computer and a display with a touch panel, or it may be constructed with a main unit of a home-use game console and a display with a touch panel.

In the video game apparatus according to an aspect of the present invention, the detector may further detect a type of the touch operation. If the position of the touch operation detected by the detector lies on the token coin array picture and if the type of the touch operation is a flick or a drag in which a touch position moves toward a predetermined one direction of array directions of the plural token coins in the token coin array picture, the processor may feed all token coins that are located on a side toward the one direction from the position of the touch operation on the token coin array picture.

Regarding "a predetermined one direction of array directions of the plural token coins in the token coin array picture", in a case of a token coin array picture MP1 shown in FIG. 12B for instance, the array directions of the plural token coins M means right and left directions in the figure, so the "predetermined one direction" means one direction that is predetermined to the right direction or the left direction. In FIG. 12B, the one direction is set to the right direction. In a case of a token coin array picture MP1 shown in FIG. 13, the array directions of the plural token coins M means upward and downward directions in the figure, so the "predetermined one direction" means one direction that is predetermined to the upward direction or the downward direction. In FIG. 13, the one direction is set to the downward direction. A starting position of the touch position of the flick operation or the drag operation is preferably used as the "position of the touch position" that is an origination to determine the number of the token coins to be fed. Alternatively, a middle point or the like of the touch position may be used. The number of the token coins to be fed may be configured to be determined based on one of the flick operation or the drag operation. The number of the token coins to be fed may be configured to be determined based on both of the flick operation and the drag operation.

In the video game apparatus according to an aspect of the present invention, if the position of the touch operation detected by the detector lies on the token coin array picture and if the type of the touch operation is a tap, the processor may feed one token coin to the field.

If the position of the touch operation detected by the detector lies on the token coin array picture, the processor may determine the number of token coins to be fed to the field out of the plural token coins that are able to be fed based on the position of the touch operation and the type of the touch operation on the token coin array picture and may feed the determined number of the token coins to the field. In other words, the number of the token coins to be fed to the field may vary depending on the type of the touch operation, even if the position of the touch operation is the same. Specifically, for instance, even if the touch position on the token coin array picture is the same, plural token coins can be fed to the field when the touch operation transits to the flick operation or the drag operation after touching the viewing area, and one token coin can be fed to the field when the type of the touch operation is the tap.

In the video game apparatus according to an aspect of the present invention, the detector may further detect a type of the touch operation. If the position of the touch operation detected by the detector lies on the token coin array picture and if the type of the touch operation is a flick or a drag in which a touch position moves toward either one of array directions of the plural token coins in the token coin array picture, the processor may feed all token coins that are located on a side toward a moving direction of the touch position from the position of the touch operation on the token coin array picture.

Regarding "either one of array directions of the plural token coins in the token coin array picture", in a case of a token coin array picture MP shown in FIG. 4 for instance, the array directions of the plural token coins M means right and left directions in the figure, so the "either one" means either one of the right direction or the left direction. In a case of a token coin array picture MP shown in FIG. 15, the array directions of the plural token coins M means upward and downward directions in the figure, so the "either one" means either one of the upward direction or the downward direction. The "position of the touch position" that is an origination to determine the number of the token coins to be fed is as described above. The number of the token coins to be fed may be configured to be determined based on one of the flick operation or the drag operation. The number of the token coins to be fed may be configured to be determined based on both of the flick operation and the drag operation.

In the video game apparatus according to an aspect of the present invention, the detector may further detect a type of the touch operations. If the two positions of the touch operations detected by the detector lie on the token coin array picture and if the type of the touch operations is a pinch out in which touch positions move toward both of array directions of the plural token coins in the token coin array picture, one of the touch operations on the two positions being a first touch operation and the other of the touch operations being a second touch operation, the processor may feed on the field all token coins that are located on a side toward a moving direction of the touch position of the first touch operation from the position of the first touch operation on the token coin array picture and all token coins that are located on a side toward a moving direction of the touch position of the second touch operation from the position of the second touch operation on the token coin array picture.

Regarding "both of array directions of the plural token coins in the token coin array picture", in a case of the token coin array picture MP shown in FIG. 4 for instance, the array directions of the plural token coins M means right and left directions in the figure, so "both of the array directions" means both of the right direction and the left direction. In a case of the token coin array picture MP shown in FIG. 15, the array directions of the plural token coins M means upward and downward directions in the figure, so the "both of the array directions" means both of the upward direction and the downward direction. A starting position of the touch position of the first touch operation is preferably used as the "position of the first touch operation" that is an origination to determine the number of the token coins to be fed. Alternatively, a middle point or the like of the touch position may be used. This is the same as the "position of the second touch operation".

The video game apparatus according to an aspect of the present invention may be provided with two feeding positions from which a token coin is fed to the field. If the position of the touch operation detected by the detector lies on the token coin array picture and if the type of the touch operation is a tap, the processor may select at least one of the feeding positions based on the position of the touch operation and may feed one token coin from each of the at least one of the feeding positions being selected.

The "feeding position from which a token coin is fed to the field" means, for instance, a tip position of a token coin feed rail 150R, 150L shown in FIG. 4 or a position of a token coin feed slot 170R, 170L shown in FIG. 14.

In the video game apparatus according to an aspect of the present invention, a feeding position from which a token coin is fed to the field may differ depending on whether the moving direction of the touch position is one of the array directions or the other of the array directions.

In other words, the token coin may be fed from a different token coin feeding position depending on whether the moving direction of the touch position is one of the array directions or the other of the array directions. The "feeding position from which a token coin is fed to the field" is as described above.

In the video game apparatus according to an aspect of the present invention, the processor may further measure moving speed of the touch position and determine feed speed of a token coin to be fed to the field based on the moving speed being measured. In this case, the processor may further include a calculator for calculating respective positions of the plural token coins on the field by executing a simulation based on physics calculations, and the calculator may calculate a position of the token coin to be fed on the field using the feed speed as one of parameters.

The video game apparatus according to an aspect of the present invention may further include a feeding position picture viewing unit for displaying a feeding position picture that shows a feeding position from which a token coin is fed to the field in the viewing area. If the position of the touch operation detected by the detector lies on the feeding position picture, the processor may change a display position of the feeding position picture and the feeding position based on the touch operation.

Examples of the "feeding position picture" include a picture of the token coin feed rail 150R, 150L shown in FIG. 4, a picture of the token coin feed rail 170R, 170L shown in FIG. 14, and a picture of a token coin feeder.

In accordance with an aspect of the present invention, a program for executing as a video game a pusher game played by feeding a token coin to a field provided with a pusher table on which plural token coins are placed and that gives reciprocal movement, causes a computer to function as: a processor for executing game processes of the pusher game; a game picture viewing unit for displaying a game picture that shows conditions of the plural token coins on the field and the pusher table in a viewing area according to a processing result by the processor; a token coin picture viewing unit for displaying a token coin array picture that shows in line plural token coins that are able to be fed to the field in the viewing area; and a detector for detecting one or more positions of one or more touch operations on the viewing area. The processor determines a number of token coins to be fed to the field out of the plural token coins which are able to be fed based on the position of the touch operation on the token coin array picture and feeds the number being determined of the token coins to the field, if the position of the touch operation detected by the detector lies on the token coin array picture.

The program according to an aspect of the present invention may be delivered from a server or the like through a communication network to be installed in a computer. Alternatively, the program may be provided to a user stored in a computer-readable storage medium to be installed in a computer. The program according to an aspect of the present invention may be preinstalled a memory of a computer.

In accordance with an aspect of the present invention, a control method for a video game apparatus for executing as a video game a pusher game played by feeding a token coin to a field provided with a pusher table on which plural token coins are placed and that gives reciprocal movement, includes: a processing step of executing, by the video game apparatus, game processes of the pusher game; a game picture displaying step of displaying, by the video game apparatus, a game picture that shows conditions of the plural token coins on the field and the pusher table in a viewing area according to a processing result by the processing step; a token coin picture viewing step of displaying, by the video game apparatus, a token coin array picture that shows in line plural token coins which are able to be fed to the field in the viewing area; and a detecting step of detecting, by the video game apparatus, one or more positions of one or more touch operations on the viewing area. The video game apparatus determines, in the processing step, a number of token coins to be fed to the field out of the plural token coins which are able to be fed based on the position of the touch operation on the token coin array picture and feeds the number being determined of the token coins to the field, if the position of the touch operation detected in the detecting step lies on the token coin array picture.

DESCRIPTION OF EMBODIMENTS

Reference is made to the attached figures to illustrate embodiments of the present invention.

1. Embodiment

Figure 1:
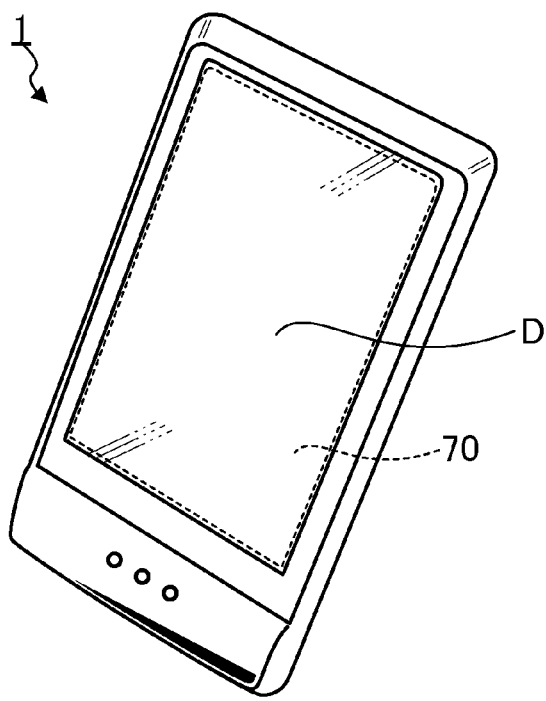
FIG. 1 is a perspective view that shows an appearance of a smartphone according to the present invention.

FIG. 1 is a perspective view that shows an appearance of a smartphone 1 according to the present invention. A viewing area D is provided on a front surface of the smartphone 1. A touch panel 70 is adhered so that it entirely covers a surface of the viewing area D. For instance, a capacitance (projected capacitive type) touch panel can be adopted as the touch panel 70. In this case, the touch panel 70 forms an electric field over its entire surface and detects a touch position by sensing a change of surface electric charge (capacitance) on a portion touched by a finger.

Figure 2:
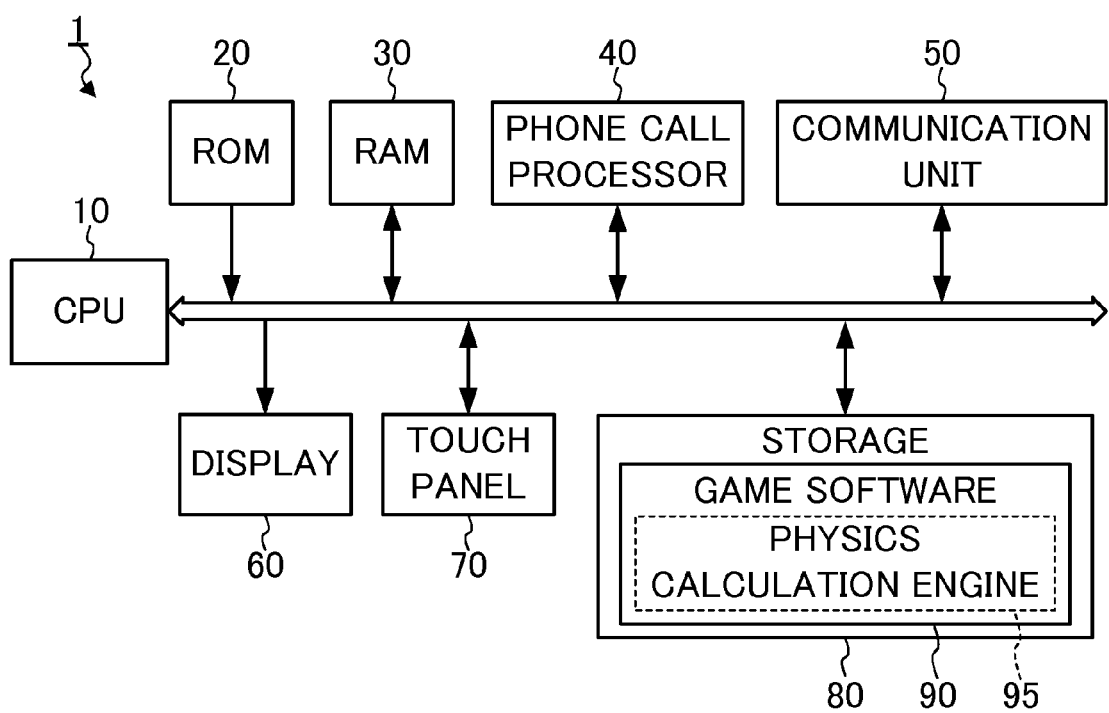
FIG. 2 is a block diagram that shows a hardware configuration of the smartphone.

FIG. 2 is a block diagram that shows a hardware configuration of the smartphone 1. For instance, the smartphone 1 includes a CPU 10, a ROM 20, a RAM 30, a phone call processor 40, a communication unit 50, a display 60, a touch panel 70, and a storage (also mentioned as an auxiliary storage device) 80. CPU 10 executes various programs stored in the ROM 20 and the storage 80 to control each element in the smartphone 1. The ROM 20 stores a boot program etc. The RAM 30 is utilized as a work area of the CPU 10. The phone call processor 40 is provided with a microphone, a speaker, a voice processor, etc., and executes processing for a phone call. The communication unit 50 communicates with servers and other mobile phones over a cellular communication network, a wireless LAN network, etc. For instance, the display 60 includes a liquid-crystal display panel and a drive circuit that executes display control thereof.

For instance, the touch panel 70 includes an insulation layer formed in an insulator such as a glass or a plastic, an electrode layer in which plural transparent electrode patterns arranged in an X-direction and plural transparent electrode patterns arranged in a Y-direction are formed, and a substrate layer provided with an IC for arithmetic processing. The touch panel 70 detects a touch position on the viewing area D and outputs position information (an X-Y coordinate value) that shows the detected touch position. The CPU 10 detects a movement direction of the touch position, a type of the touch operation, etc. based on the position information output from the touch panel 70. Detectable types of touch operations include, for instance, a tap, a flick, a drag, a pinch, etc. The tap is an operation of lightly striking the viewing area D once with a fingertip. The flick is an operation of lightly sweeping the viewing area D with a fingertip. The drag is an operation of moving a fingertip with contacting on the viewing area D. The pinch is an operation of spreading or gathering two fingertips with contacting on the viewing area D.

The storage 80 is, for instance, a flash memory and stores a game software 90 for executing a pusher game as a video game. The game software 90 is equipped with a physics calculation engine 95. The game software 90 may be downloaded from a server through a cellular communication network, a wireless LAN network, etc., and may be installed in the storage 80. Alternatively, the game software 90 may have been stored in a memory card or the like and may be installed in the storage 80 through a slot (not shown) of the smartphone 1. The game software 90 may be preinstalled in the storage 80.

Figure 3:
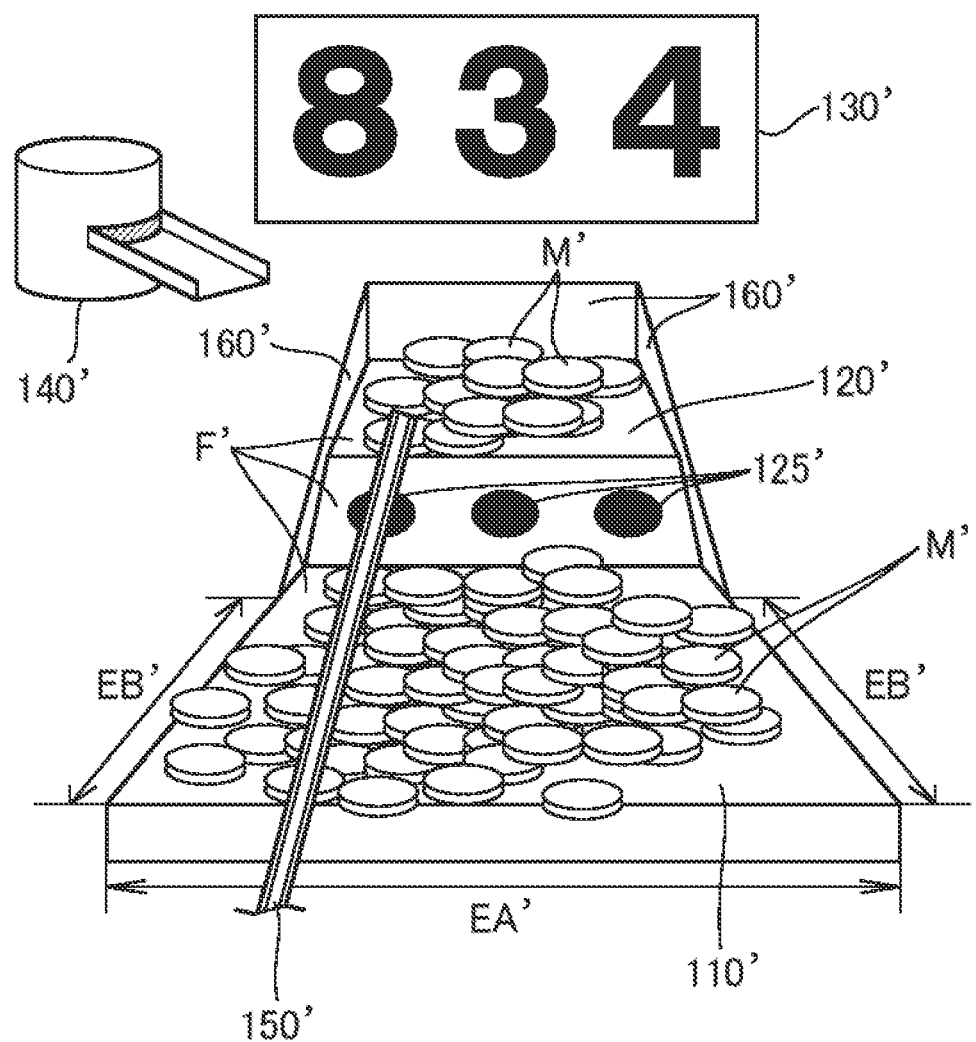
FIG. 3 illustrates a general outline of a pusher game.

FIG. 3 illustrates a general outline of a pusher game.

Explanation will be provided taking as an example a real pusher game machine located in a game arcade or the like. A main table 110' is a plate-like member that is substantially horizontally fixed. A pusher table 120' is a pedestal-like member that is arranged on the main table 110' and gives reciprocal movement in front-back direction from a standpoint of a player placed on the near side of the figure. For example, the pusher table 120' may give the reciprocal movement repeatedly at a constant moving speed.

An inclined plane is formed on a forefront (near side in the figure) of the pusher table 120'. Three token coin checkers 125' that detect a token coin M' are provided on the inclined plane. Each token coin checker 125' is equipped with a circular detection window that is slightly smaller than an external form of the token coin M', and outputs a token coin detection signal when the token coin M' slides down the inclined plane and covers the entire detection window. When any token coin checker 125' outputs the token coin detection signal, a lottery game is executed. The lottery game is a slot game in which one competes for whether or not a combination of three figures matches a predetermined winning combination. Images concerning the slot game are displayed in a lottery figure viewing unit 130'. Specifically, each of the three figures is decoratively displayed in sequence from a beginning of variable showing of the figures to an end in the lottery figure viewing unit 130'.

If one wins the lottery game with any predetermined winning combination (e.g., if a combination of the three figures after the end of the variable showing in the lottery figure viewing unit 130' matches "777"), the predetermined number of the token coins M' are supplied onto a field F' from a token coin supplier 140'. The field F' includes the top surface (i.e., the level plane and the inclined plane) of the pusher table 120' and the top surface of the main table 110'. Plural token coins M' are randomly laid on the field F'. Token coins M' that are supplied from the token coin supplier 40' or that a player feeds using a token coin feeder, which is called the "token coin chute", are supplied onto the field M'. The player is able to adjust a tip position of a token coin feed rail 150' by operating the token coin feeder. The token coin M' is led to a position designated by the player using the token coin feed rail 150' and drops from the tip of the token coin feed rail 150' onto the field F'.

The pusher table 120' is surrounded on the three sides except for the near side of the figure by a wall surface 160'. There is a concave portion (a rectangular parallelepiped depression) on the bottom of the far side of the wall surface 160'. A large portion of the pusher table 120' except for its forefront (the inclined plane) is housed in the concave portion when the pusher table 120' moves to the far side of the figure. As a result, out of the token coins M' that are fed by the player and that are supplied from the token coin supplier 40', the token coins M' which are supplied onto the top surface (the level plane) slide down the inclined plane of the pusher table 120' onto the main table 110' when the pusher table 120' moves to the far side of the figure. At that time, if any token coin checker 125' detects the token coin detection signal, the lottery game is initiated.

Out of the token coins M' that are fed by the player and that are supplied from the token coin supplier 40', the token coins M' which are supplied to the far side of the main table (i.e., within a range of movement of the pusher table 120') and which slide down from the top surface of the pusher table 120' are pushed out by the pusher table 120' when it moves to the near side of the figure. As a result, multiple token coins M' on the main table 110' are pushed one after another, so that token coins M' which are located around the outer edges of the main table 110' drop from the main table 110'. Sides of the main table 110' from which the token coins M' can drop are classified into invalid sides EB' which are located at either side of the figure and a valid side EA' which is located at the near side of the figure. Whereas the token coins M' which drop from the valid side EA' are paid out to the player, the token coins M' which drop from an invalid side EB' are not paid out to the player.

When a large number of token coins M' are supplied from the token coin supplier 40', for instance, when one wins the lottery game with a predetermined winning combination, wall surfaces advance onto the two invalid sides EB' so that the token coins M' do not drop from the invalid sides EB'. A special token coin, different from the normal token coin M', or an item such as a ball, may be supplied onto the field F'. The special token coin has a different appearance or a different color from the normal token coin M'. When the special token coin drops from the valid side EA', a predetermined number of the token coins M' may be paid out for the player. When an item different from the token coin, for instance, the ball drops from the valid side EA', a lottery game different from the slot game (e.g., a lottery game using the ball such as a roulette game or a bingo game) is executed.

The previously-noted game software 90 is to execute the above-described pusher game as a video game in the smartphone 1. The physics calculation engine 95 equipped in the game software 90 simulates movement of the pusher table, respective locations of the token coins on the field, a drop position of the token coin fed onto the field, etc., by executing physics calculations using the following elements as parameters. As a result, the smartphone 1 can generate a realistic game picture and display it on the viewing area D.

(1) Size, shape, thickness, weight, and coefficient of friction of the token coin,
(2) Size, shape, thickness, weight, coefficient of friction of the pusher table,
(3) Size, shape, and coefficient friction of the main table,
(4) A tip position of the token coin feed rail, and
(5) Gravity.

Figure 4:
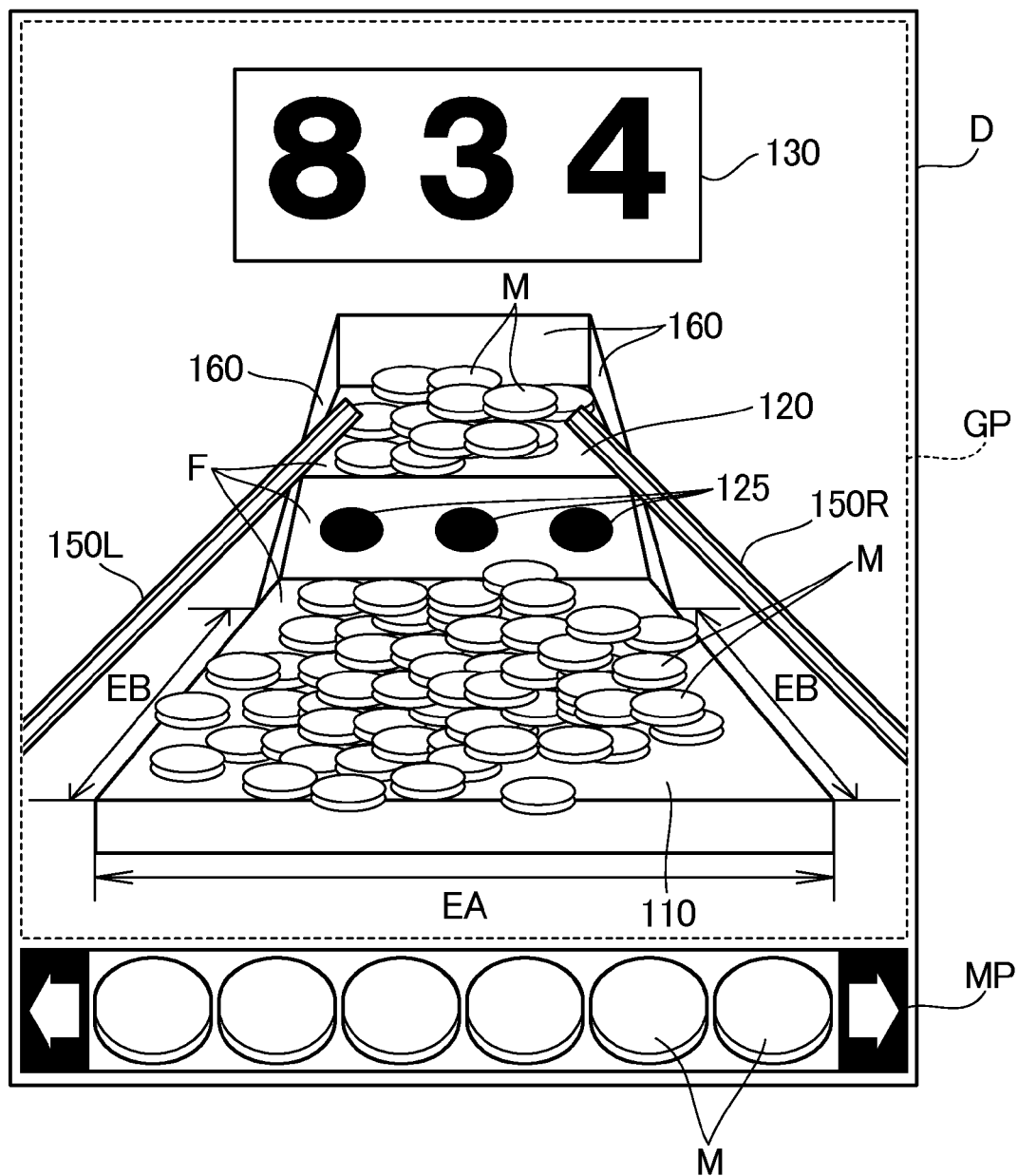
FIG. 4 is a figure that shows a display example of a pusher game executed in the smartphone.

FIG. 4 is a figure that shows a display example of a pusher game executed by the smartphone 1.

The CPU 10 displays a game picture GP on top of the viewing area D and displays a token coin array picture MP on bottom of the viewing area D. The game picture GP shows conditions of plural token coins M on a field F, a pusher table 120, and so on. More specifically, images of a main table 110, the pusher table 120, three token coin checkers 125, the plural token coins M on the field F, a lottery figure viewing area 130, two token coin feed rails 150R, 150L (on each side), a wall surface 160, etc., are displayed as the game picture GP. Although an image of the token coin supplier 40' is not displayed in the game picture GP, a large number of token coins M are supplied onto the field F if one wins the lottery game with a predetermined winning combination. A player can feed a token coin M onto the field F using any of the two token coin feed rails 150R, 150L on each side.

The token coin array picture MP shows in line the token coins M which are able to be fed onto the field F. For instance, at most six token coins M are arranged in a transverse direction as shown in FIG. 4. If the player has six or more token coins, the token coin array picture MP with six token coins M in a row is displayed. If the player has 5 or fewer token coins, the token coin array picture MP with remaining token coins M in a row is displayed. As a result, the player can understand that the player has few token coins based on the token coin array picture MP.

The CPU 10 executes game processes regarding the pusher game and generates the game picture GP according to a processing result to display in the viewing area D. The game processes regarding the pusher game include processes as follows:

(1) A process of calculating a position of the pusher table 120 and respective positions of the token coins M on the field F using the physics calculation engine 95, the positions varying from moment to moment, (2) A process of deciding the number of the token coins M to be fed and the token coin feed rail to be used based on a touch operation to the token coin array picture MP, (3) A process of changing a position of the token coin feed rail 150R, 150L based on a touch operation, and (4) A process regarding the lottery game.

Figure 5:
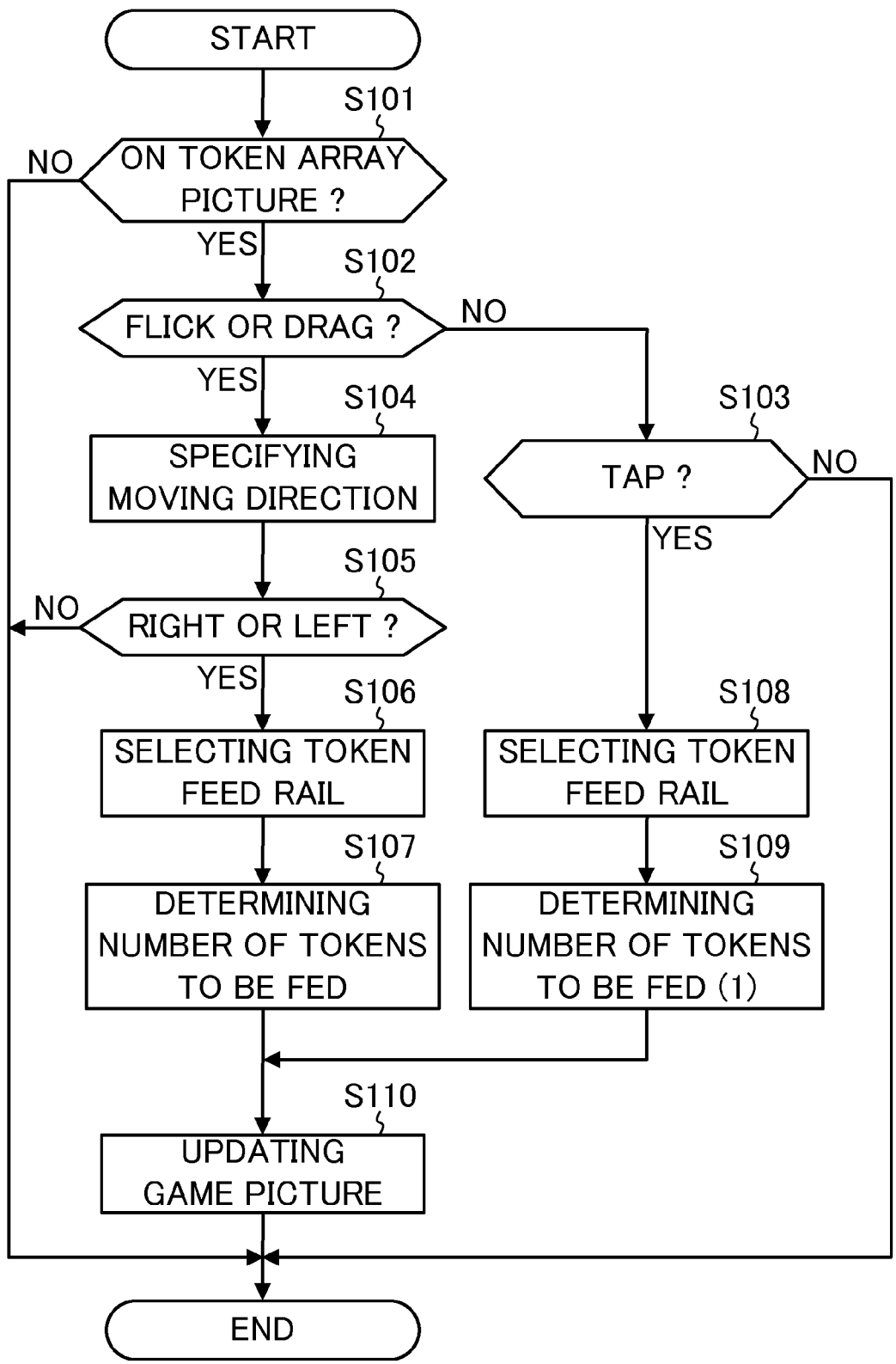
FIG. 5 is a flowchart that shows a flow of a token coin feed process.

FIG. 5 is a flowchart that shows a flow of a token coin feed process.

When the player initiates the game software 90 to begin the pusher game, the touch panel 70 begins a process to detect a touch position under control of the CPU 10. If position information (an X-Y coordinate value) of a touch position is input from the touch panel 70, the CPU 10 begins a process shown in FIG. 5.

When the token coin feed process begins, the CPU 10 determines whether or not the touch position lies on the token coin array picture MP (step S101). The storage 80 stores range information that represents a display area of the token coin array picture MP, such as diagonal coordinate values (i.e., an X-Y coordinate value of an upper left vertex and an X-Y coordinate value of a lower right vertex) demarcates a display area of the token coin array picture MP. The CPU 10 determines whether or not the touch position lies on the token coin array picture MP by examining whether or not the X-Y coordinate value of the touch position is included in a rectangular area represented by the range information. If the determination result in the step S101 is NO, the CPU 10 ends the token coin feed process.

On the other hand, if the determination result in the step S101 is YES, the CPU 10 determines the type of the touch operation (steps S102, S103). The touch panel is successively detecting the touch position to output position information to the CPU 10. As a result, the CPU 10 can recognize a trace of the touch position based on the position information that is successively input from the touch panel 70. Furthermore, based on the trace of the touch position, the CPU 10 can determine the type of the touch operation, such as a flick, a drag, and a tap. If the type of the touch operation is a flick or a drag (step S102: YES), the CPU 10 proceeds to a step S104. If the type of the touch operation is a tap (step S103: YES), the CPU 10 proceeds to a step S108. If the type of the touch operation is not a flick, a drag, or a tap (step S103: NO), the CPU 10 ends the token coin feed process.

If the type of the touch operation is a flick or a drag, the CPU 10 specifies a moving direction of the touch position (step S104). For instance, if the player carries out a drag operation shown in FIG. 6A, the CPU 10 specifies that the moving direction of the touch position is to the right. If the player carries out a flick operation shown in FIG. 6B, the CPU 10 specifies that the moving direction of the touch position is to the left. Hatched portions in FIGS. 6A to 6C correspond to the traces of the touch position. In the step S104, the moving direction is classified as right or left unless the moving direction of the touch position is just top or just bottom.

Subsequently, the CPU 10 determines whether or not the specified direction of the touch position is either right or left (step S105). If the direction of the touch position is neither right nor left (step S105: NO), that is, if the direction of the touch position is only top or only bottom, the CPU 10 regards the operation as invalid and ends the token coin feed process. On the other hand, if the direction of the touch position is right or left (step S105: YES), the CPU 10 selects a token coin feed rail to be used for feeding the token coin M based on the direction of the touch position (step S106). In this case, the right token coin feed rail 150R is selected if the direction of the touch position is right, whereas the left token coin feed rail 150L is selected if the direction of the touch position is left.

Subsequently, the CPU 10 determines the number of the token coins M to be fed based on the touch position (step S107). Specifically, in the token coin array picture MP, the CPU 10 determines all token coins M which are located on the moving-direction side of a starting point of the touch position as token coins M to be fed onto the field F. For instance, in a case of FIG. 6A, it is determined that the four token coins M are to be fed. In a case of FIG. 6B, it is determined that the two token coins M are to be fed.

Figure 6A:
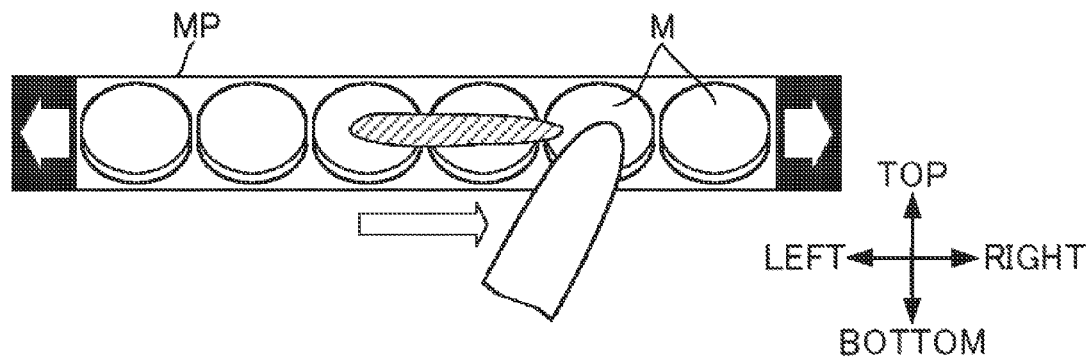
FIG. 6A is a figure that shows a concrete example of a touch operation (a drag).

In other words, if the player carries out the drag operation shown in FIG. 6A, the CPU 10 determines to feed the four token coins M using the right token coin feed rail 150R. If the player carries out the flick operation shown in FIG. 6B, the CPU 10 determines to feed the two token coins M using the left token coin feed rail 150L.

Figure 6B:
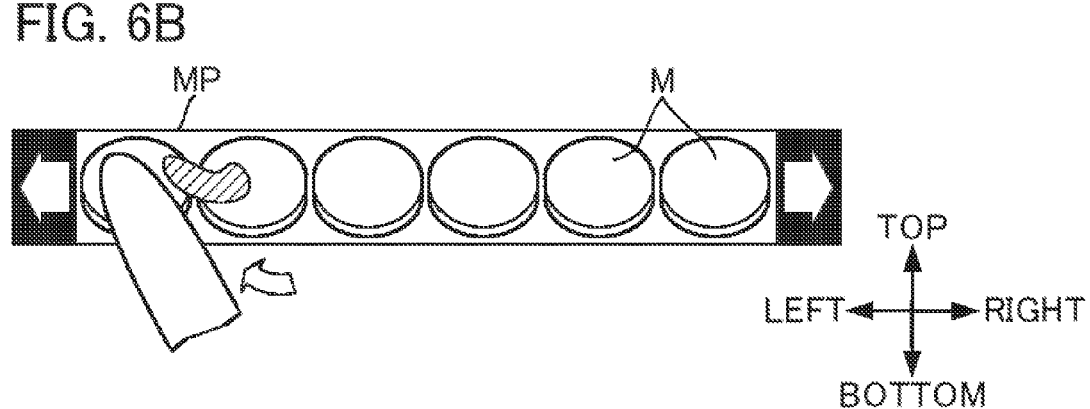
FIG. 6B is a figure that shows a concrete example of a touch operation (a flick).
Figure 6C:
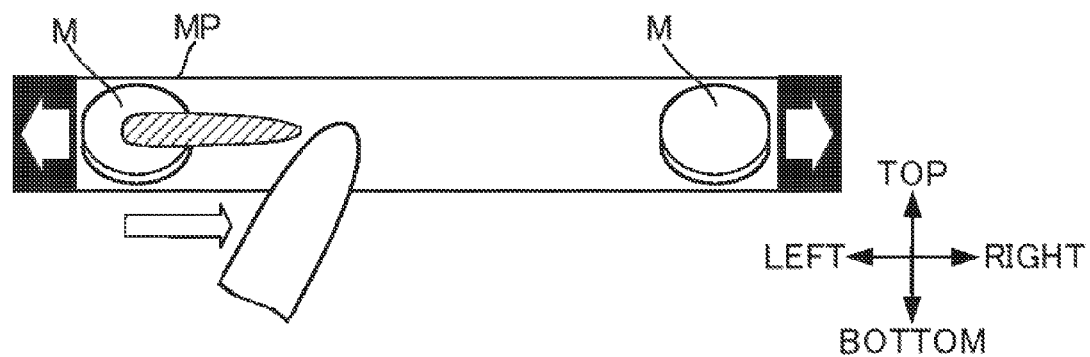
FIG. 6C is a figure that shows a concrete example of a touch operation (a drag).

If the total number of the token coins that the player has is two, for example, the token coin array picture MP in which the two token coins M are arranged on both ends is displayed as shown in FIG. 6C. In this case, the CPU 10 also selects a token coin feed rail based on the direction of the touch position, and determines all token coins M which are located on the moving-direction side of a starting point of the touch position as token coins M to be fed onto the field F. Therefore, if the player carries out the drag operation shown in FIG. 6C, the CPU 10 determines to feed the two token coins M using the right token coin feed rail 150R.

In FIGS. 6A to 6C, the token coin M which is located at a starting point of the touch position may be excluded from the token coins M to be fed. In this case, the number of the token coins to be fed is determined to be three according to the operation of FIG. 6A, and the number of the token coins to be fed is determined to be one according to the operations of FIGS. 6B and 6C. In the above explanation, the number of the token coins M to be fed is determined taking the starting point of the touch operation as the origin. Alternatively, a middle point or the like of the touch operation may be used as a substitute of the starting point of the touch operation.

Figure 7A:
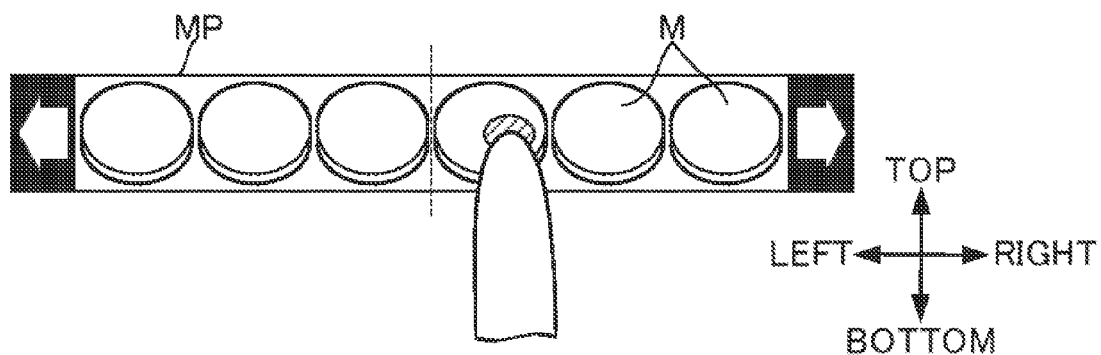
FIG. 7A is a figure that shows a concrete example of a touch operation (a tap).
Figure 7B:
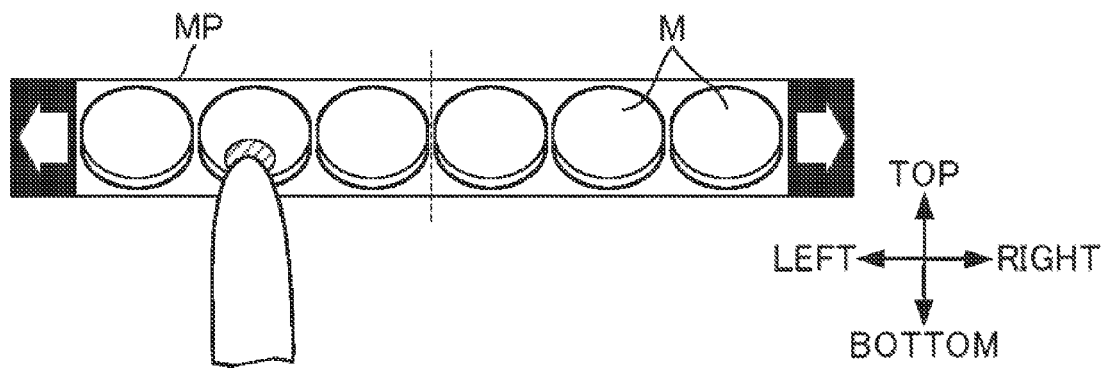
FIG. 7B is a figure that shows a concrete example of a touch operation (a tap).

On the other hand, if the type of the touch operation is a tap (step S103: YES), the CPU 10 selects a token coin feed rail to be used for feeding the token coin M based on the touch position (step S108). For instance, as shown in FIG. 7A, if one taps on the right side of the center line of the token coin array picture MP, the CPU 10 selects the right token coin feed rain 150R. As shown in FIG. 7B, if one taps on the left side of the center line of the token coin array picture MP, the CPU 10 selects the left token coin feed rain 150L. In the case of the tap operation, the CPU 10 determines the number of the token coins to be fed to be one regardless of the touch position (step S109).

In other words, if the player carries out the tap operation shown in FIG. 7A, the CPU 10 determines to feed a single token coin M using the right token coin feed rail 150R. If the player carries out the tap operation shown in FIG. 7B, the CPU 10 determines to feed a single token coin M using the left token coin feed rail 150L.

After the step S107 or the step S109, the CPU 10 executes an update process of the game picture GP with respect to feeding the token coins M (step S110). For instance, if the player carries out the drag operation shown in FIG. 6A, the CPU 10 generates the game picture GP in which the four token coins M are fed to the field F by the use of the right token coin feed rail 150R to display in the viewing area D. If the player carries out the tap operation shown in FIG. 7B, the CPU 10 generates the game picture GP in which the single token coin M is fed to the field F by the use of the left token coin feed rail 150L to display in the viewing area D. In those cases, the CPU 10 calculates respective drop positions of the token coins M fed onto the field F using the calculation engine 95.

As described above, if the position of the touch operation that is detected by the touch panel 70 is located on the token coin array picture MP, the CPU 10 determines the number of the token coins M to be fed and the token coin feed rail to be used, and after that the CPU 10 immediately executes a process to feed the token coin M onto the field F. Therefore, a time point of feeding the token coin M is also determined according to the touch operation on the token coin array picture MP.

Figure 8:
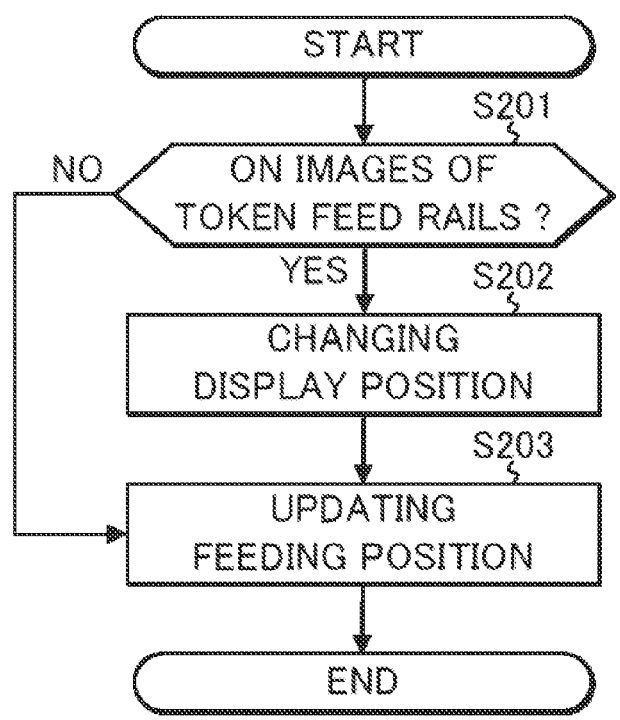
FIG. 8 is a flowchart that shows a process to change a feeding position of a token coin.

FIG. 8 is a flowchart that shows a process to change a feeding position of the token coin.

Similar to the above-described token coin feed process, the process shown in the figure is executed by the CPU 10 when the position information is input from the touch panel 70 during execution of the pusher game. The CPU 10 determines whether or not the touch position lies on images of the token coin feed rails 150R, 150L (step S201). The storage 80 stores range information that represents a display area of the right token coin feed rail 150R and range information that represents a display area of the left token coin feed rail 150L. The CPU 10 determines whether or not the touch position lies on the images of the token coin feed rails 150R, 150L by comparing an X-Y coordinate value of the touch position with those two types of the range information. If the determination result of the step S201 is NO, the CPU 10 ends the process to change the feeding position of the token coin.

Figure 9:
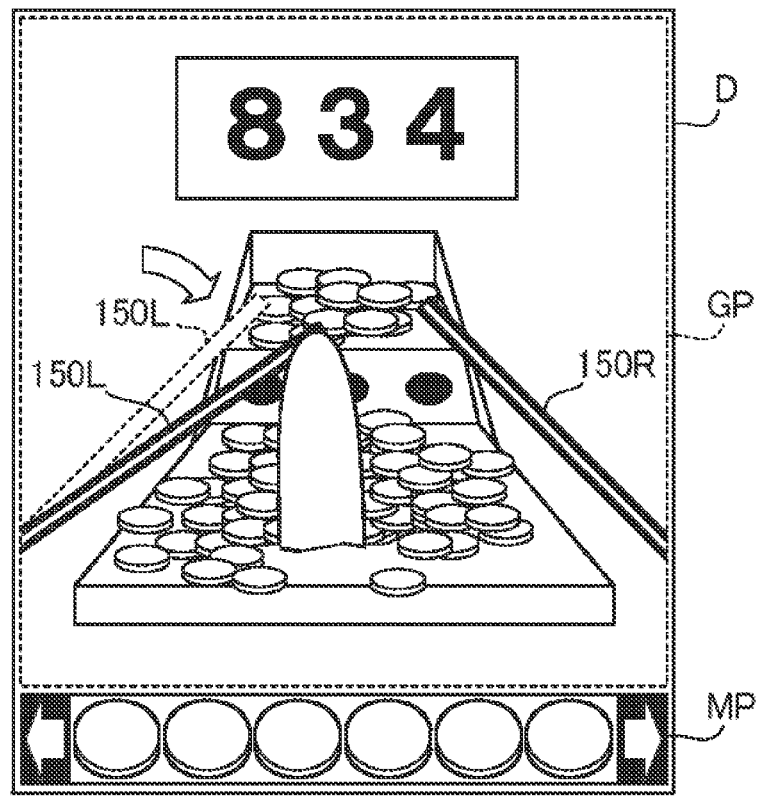
FIG. 9 is an explanatory figure regarding a case in which the feeding position of the token coin is changed.

On the other hand, if the determination result of the step S201 is YES, the CPU 10 changes a display position of a token coin feed rail 150R, 150L according to the touch operation (step S202). In this case, if the touch position lies on the image of the right token coin feed rail 150R, the display position of the right feed rail 150R is changed according to the touch position. If the touch position lies on the image of the left token coin feed rail 150L, the display position of the left feed rail 150L is changed according to the touch position. For instance, as shown in FIG. 9, if the player touches the tip of the left token coin feed rail 150L as indicated by a dashed line in the figure and carries out a drag operation in a lower right direction, the display position of the left token coin feed rail 150L is changed to a position as indicated by a solid line. In the case in which the display position of the left token coin feed rail 150L is changed, the CPU 10 updates the range information of the left token coin feed rail 150L stored in the storage 80.

The change of the display position of the token coin feed rails 150R, 150L does not depend on the drag operation alone. For instance, if the player taps the tip of the left token coin feed rail 150L, the CPU 10 selects the left token coin feed rail 150L as an object for changing a display position, and changes the display position of the left token coin feed rail 150L so that the tip will be located at a position that the player taps next. By touching not only the tip of the token coin feed rail 150R, 150L but any point on the image of the token coin feed rail 150R, 150L, the display position can be changed.

Subsequently, the CPU 10 updates information of the tip position of the token coin feed rail whose display position is changed, that is, the feeding position in which the token coin M is fed onto the field F (step S203). The storage 80 stores feeding position information (right side) that represents the tip position of the right token coin feed rail 150R and feeding position information (left side) that represents the tip position of the left token coin feed rail 150L. For instance, if the display position of the left token coin feed rail 150L is changed, the CPU 10 updates the feeding position information (left side) stored in the storage 80 based on the changed display position of the left token coin feed rail 150L. As described above, the tip position of the token coin feed rail 150R, 150L (i.e., the feeding position) is utilized as a parameter when the drop position of the token coin M fed onto field F is calculated using the physics calculation engine 95.

According to the above-described embodiment, the token coin array picture MP that shows in line the plural token coins M which are able to be fed onto the field F as well as the game picture GP that shows the conditions of the plural token coins M on the field F and the pusher table 120 are displayed in the viewing area D. If the position of the touch operation that is detected by the touch panel 70 is located on the token coin array picture MP, the CPU 10 determines the number of the token coins M to be fed and the token coin feed rail to be used based on the touch position, the moving direction of the touch position, and the type of the touch operation. Subsequently, the CPU 10 executes the process to feed the token coin M onto the field F.

As a result, the player can indicate the number of the token coins M to be fed, the token coin feed rail to be used, and the time point to feed the token coin M by carrying out the touch operation (flick, drag, tap) to the token coin array picture MP that is displayed on the viewing area D. In other words, the number of the token coins M to be fed, the token coin feed rail to be used, and the time point to feed the token coins M can be indicated by a single touch operation on the token coin array picture MP at the same time. Accordingly, the indication relevant to feeding token coins can be appropriately carried out with a small number of touch operations, which improves operability of the video pusher game. Furthermore, the plural token coins M can be fed without missing an intended time point of feeding.

According to this embodiment, the player can change the position of the token coin feed rail 150R, 150L to adjust the drop position of the token coin M to be fed onto the field F by carrying out the touch operation on the image of the token coin feed rail 150R, 150L displayed in the viewing area D.

2. Modifications

This invention is not limited to the above-described embodiment, and it can be modified as follows. Two or more modifications below can be combined if appropriate.

Modification 1

Figure 10:
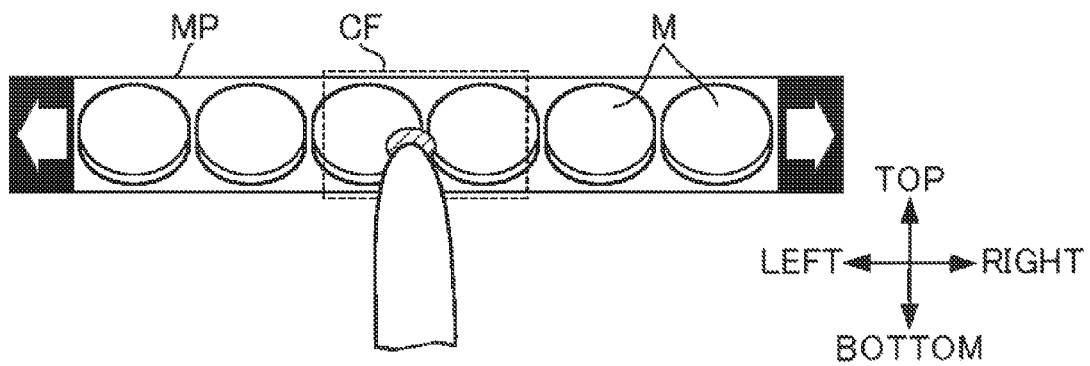
FIG. 10 is an explanatory figure regarding a modification (tap) of the token coin feed process.

As shown in FIG. 10, the token coin array picture MP may have a central area CF in the middle of the token coin array picture MP. The CPU 10 may determine to feed each single token coin M using each of the token coin feed rails 150R, 150L on both sides if one taps on the inside of the central area CF. The CPU 10 may determine to feed a single token coin M using the right token coin feed rail 150R if one taps on the right side of the central area CF of the token coin array picture MP. The CPU 10 may determine to feed a single token coin M using the left token coin feed rail 150L if one taps on the left side of the central area CF of the token coin array picture MP. In this case, tapping on the inside of the central area F can indicate simultaneous feeding of the two token coins M using both of the token coin feed rails 150R, 150L on both sides. Although a single-tap operation is preferable for the tap operation, a double-tap operation may be adopted.

Modification 2

Figure 11:
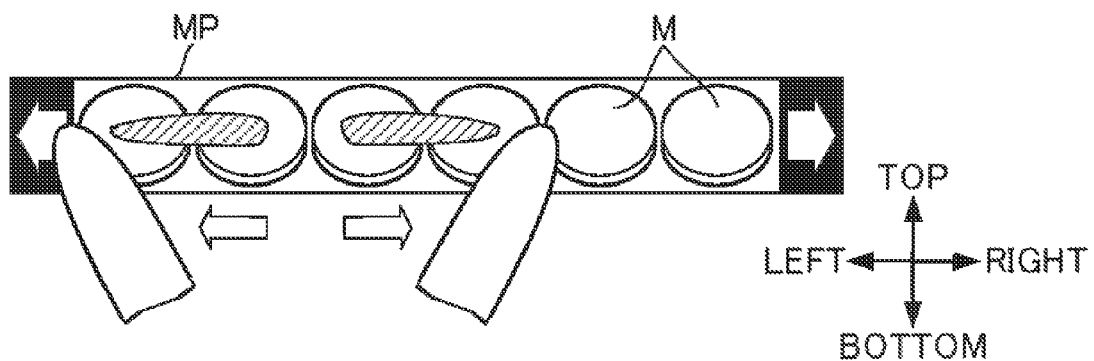
FIG. 11 is an explanatory figure regarding a modification (pinch out) of the token coin feed process.

A pinch out may indicate to feed the token coin M. As shown in FIG. 11, the pinch out is an operation of spreading two fingers with contacting on the viewing area D. In this case, the CPU 10 determines that the type of the touch operation is the pinch out if conditions in which two points on the token coin array picture MP are touched at the same time and in which directions of the touch positions are opposite each other and the touch positions increasingly separate from each other are fulfilled. The CPU 10 determines that the operation is valid when the directions of the touch positions are both right and left. Subsequently, based on the pinch out operation determined as valid, the CPU 10 determines the number of the token coins M to be fed using the right token coin feed rail 150R and the number of the token coins M to be fed using the left token coin feed rail 150L. For instance, in a case of FIG. 11, the CPU 10 determines to feed the 4 token coins M using the right token coin feed rail 150R based on the touch operation with one finger in a right direction shown in the figure, and determines to feed the two token coins M using the left token coin feed rail 150L based on the touch operation with another finger in a left direction shown in the figure.

In this case, the player can indicate simultaneous feeding of the plural token coins M using both of the token coin feed rails 150R, 150L on both sides by carrying out the pinch out operation. With respect to the pinch out operation, not only a starting position of the touch position, but also a middle position of the touch position or the like, may be a touch position as an origin to determine the number of the token coins M to be fed. The token coin M which is located on the starting point of the touch position may be excluded from the token coins M to be fed.

Modification 3

The CPU 10 may measure moving speed of the touch position and may determine feed speed of the token coin M to be fed onto the field F based on the measured moving speed. Since the touch panel successively outputs an X-Y coordinate value of the touch position, the CPU 10 can determine the moving speed on the touch position by calculating a moving distance of the touch position per unit time. The CPU 10 may determine that the higher value the feed speed of the token coin M is, the faster the moving speed of the touch position is. The feed speed of the token coin M may be used as one of parameters together with the tip position of the token coin feed rail 150R, 150L when the drop position of the token coin M is calculated using the physics calculation engine 95.

Even if the position of the token coin feed rail 150R, 150L is fixed, the drop position of the token coin M to be fed onto the field M may vary according to the feed speed of the token coin M. For instance, if the feed speed of the token coin M is high, the token coin M drops at a position distant from the tip position of the token coin feed rail 150R, 150L. If the feed speed of the token coin M is low, the token coin M drops at a position close to the tip position of the token coin feed rail 150R, 150L. As a result, the player can indicate the feed speed of the token coin M to adjust the drop position of the token coin M on the field F by changing fingering speed of the touch operation (flick, drag, pinch out) on the token coin array picture MP.

Modification 4

Figure 12A:
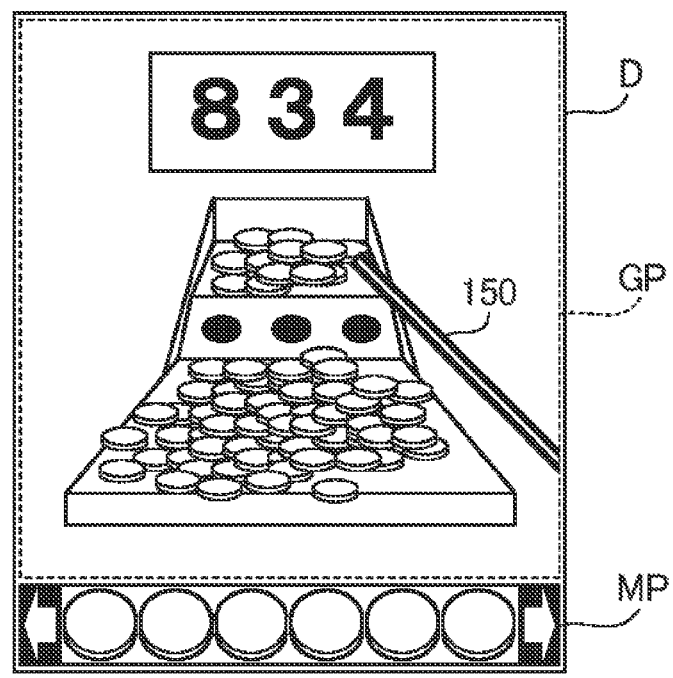
FIG. 12A is a figure that shows a display example (modification) of the pusher game.

As shown in FIG. 12A, only a single token coin feed rail 150 may exist. In this case, the number of the token coins M that are determined according to the flick operation or the drag operation in the right direction on the token coin array picture MP and the number of the token coins M that are determined according to the flick operation or the drag operation in the left direction on the token coin array picture MP may be fed to the field F using the token coin feed rail 150. In the case of the pinch out operation, the total number of the token coins M that are determined by the touch operation in the right direction with one finger and that are determined by the touch operation in the left direction with another finger may be fed to the field F using the token coin feed rail 150. If the tap operation is carried out somewhere on the token coin array picture shown in FIG. 12A, a single token coin M may be fed to the field F using the token coin feed rail 150.

As described above, in the case in which only a single token coin feed rail 150 exists, the CPU 10 determines the number of the token coins M to be fed based on the touch position, the moving direction of the touch position, and the type of the touch operation and feeds the token coins M to the field F, if the position of the touch operation detected by the touch panel 70 lies on the token coin array picture MP. As a result, the player can indicate the number of the token coins M and the time point of feeding at the same time by a single touch operation (flick, drag, pinch out, tap) on the token coin array picture MP.

Figure 12B:
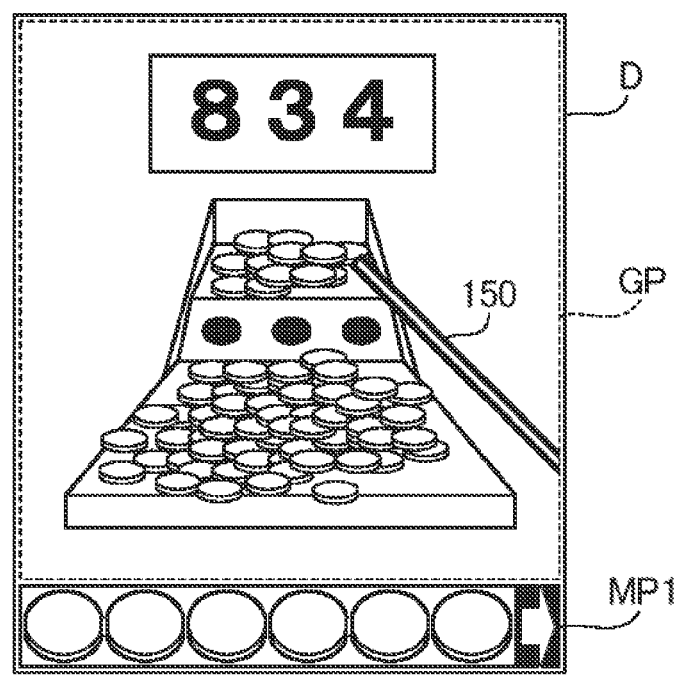
FIG. 12B is a figure that shows a display example (modification) of the pusher game.

Alternatively, as shown in FIG. 12B, out of the flick operation and the drag operation on a token coin array picture MP1, the CPU 10 may accept the flick operation and the drag operation in a right direction shown in the figure as a valid operation, and may reject the flick operation and the drag operation in a left direction shown in the figure as an invalid operation. In other words, the flick operation and the drag operation in which the touch position moves in a predetermined one direction of array directions of the token coins in the token coin array picture may be accepted. In this case, the player can indicate the number of the token coins M and the time point of feeding at the same time by a single touch operation (flick, drag) on the token coin array picture MP1.

If the tap operation is carried out somewhere on the token coin array picture MP1 shown in FIG. 12B, the CPU 10 may determine to feed a single token coin M using the token coin feed rail 150. As a result, the player may also indicate the number of the token coins M to be fed (one) and the time point of feeding at the same time by a single tap operation on the token coin array picture MP1.

In the case of FIG. 12B, the tap operation can indicate to feed two or more of the token coins M. For instance, if the third token coin M from the right is tapped in the token coin array picture MP1 shown in FIG. 12B, the CPU 10 may determine the three token coins M to be fed using the token coin feed rail 150. If the leftmost token coin M is tapped in the token coin array picture MP1, the CPU 10 may determine the six token coins M to be fed using the token coin feed rail 150. Regarding FIG. 12B, not only in a case of a tap, but in a case of a flick or a drag, if the position of the touch operation detected by the touch panel 70 lies on the token coin array picture MP1, the CPU 10 can determine the number of the token coins M to be fed to the field F based on the position of the touch operation (e.g., the starting point of the touch position) and feed the determined number of the token coins M to the field F, without specifying the type of the touch operation and the moving direction of the touch position.

As described above regarding FIG. 12B, if the position of the touch operation detected by the touch panel 70 lies on the token coin array picture MP1, the CPU 10 can determine the number of the token coins M to be fed to the field F based on the touch position and feed the determined number of the token coins M, without specifying the type of the touch operation and the moving direction of the touch position. As a result, the player can indicate the number of the token coins M to be fed and the time point to feed the token coins M by touching a position corresponding to the desired number of the token coins M to be fed on the token coin array picture MP1 displayed in the viewing area D. The player can indicate the number of the token coins M to be fed and the time point to feed the token coins M at the same time by a single touch operation on the token coin array picture MP1.

Modification 5

Figure 13:
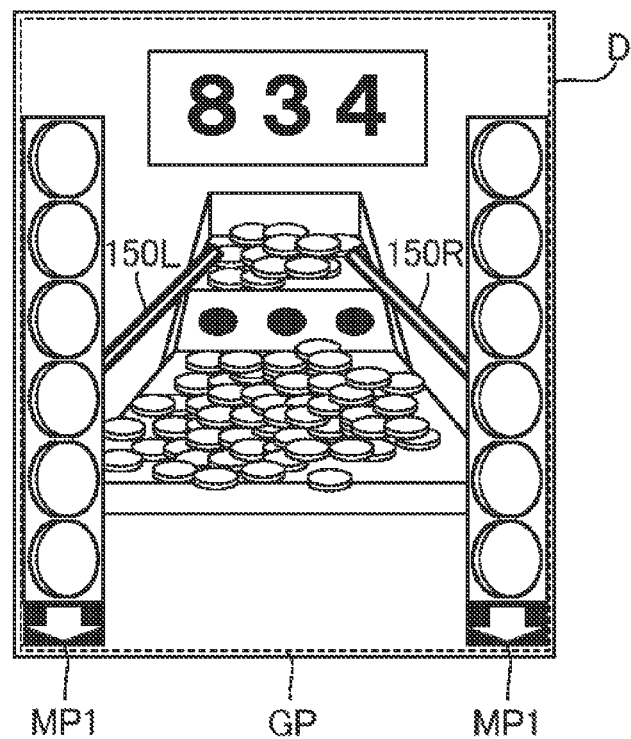
FIG. 13 is a figure that shows a display example (modification) of the pusher game.

In the viewing area D, the token coin array picture MP, MP1 may be displayed on the top side and the game picture GP may be displayed on the bottom side. Alternatively, as shown in FIG. 13, the token coin array pictures MP1 may be displayed in both of the right side and the left side of the viewing area D. In this case, the number of the token coins M determined by the touch operation on the right token coin array picture MP1 are fed to the field F using the right token coin feed rail 150R. The number of the token coins M determined by the touch operation on the left token coin array picture MP1 are fed to the field F using the left token coin feed rail 150L. In the case of FIG. 13, the CPU 10 accepts the flick operation or the drag operation in a downward direction shown in the figure as a valid operation out of the flick operation and the drag operations on each token coin array picture MP1.

For instance, if the drag operation on the right token coin array picture MP1 shown in FIG. 13 is carried out in a downward direction from the fourth token coin M from the bottom as a starting point, the CPU 10 determines to feed the four token coins M using the right token coin feed rail 150R. If the tap operation is carried out somewhere on the left token coin array picture MP1 in FIG. 13, the CPU 10 determines to feed a single token coin M using the left token coin feed rail 150L. In the case of FIG. 13, similar to the above-described Modification 4, the tap operation can indicate to feed two or more of the token coins M. In FIG. 13, the right token coin array picture MP1 may be slantwise displayed in parallel with the token coin feed rail 150R and the left token coin array picture MP1 may be slantwise displayed in parallel with the token coin feed rail 150L. As described above, each token coin array picture MP1 is displayed in parallel with and close to the corresponding token coin feed rail and the flick operation or the drag operation in the direction to the apical end of each token coin feed rail is accepted out of the flick operation and the drag operation on each token coin array picture MP1. As a result, one can indicate to feed the token coins M by running a fingertip along the token coin feed rail.

Modification 6

Figure 14:
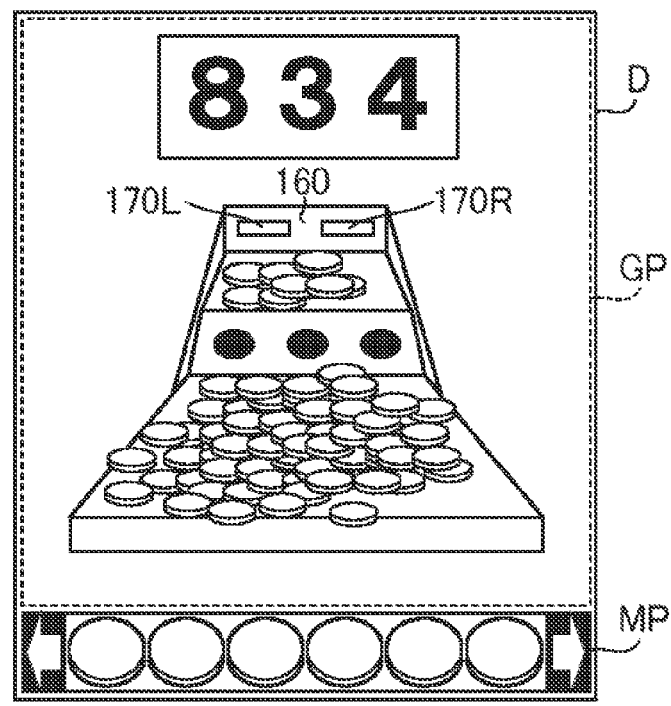
FIG. 14 is a figure that shows a display example (modification) of the pusher game.

As shown in FIG. 14, token coin feed slots 170R, 170L may be displayed as a substitute for the token coin feed rails 150R, 150L. In this case, for instance, if the flick operation or the drag operation is carried out in a right direction on the token coin array picture MP, the number of the token coins M determined by the operation are fed from the right token coin feed slot 170R onto the field F. If the flick operation or the drag operation is carried out in a left direction on the token coin array picture MP, the number of the token coins M determined by the operation are fed from the left token coin feed slot 170L onto the field F. Similar to the token coin feed rails 150R, 150L, the positions of the token coin feed slots 170R, 170L may be adjusted right and left or up and down. The number of the token coin feed slots 170R, 170L may be one rather than two.

The token coin feed rails 150R, 150L or the token coin feed slots 170R, 170L are not necessarily displayed. Even if the token coin feed rails 150R, 150L or the token coin feed slots 170R, 170L are not displayed, the number of the token coins M indicated by the touch operation can be fed onto the field F from positions corresponding to the token coin feed rails 150R, 150L or the token coin feed slots 170R, 170L.

Modification 7

The smartphone 1 may detect a tilt of the body (the smartphone 1) by a built-in acceleration sensor (not shown) if an auto-rotation function is turned on. If the body turns sideways, display data displayed in the viewing area D automatically turns sideways. If the body turns upright, the display data displayed in the viewing area D automatically turns upright. For instance, when being upright, similar to FIG. 4, the game picture GP is displayed on top of the viewing area D and the token coin array picture MP is displayed at the bottom of the viewing area D. In contrast, when sideways, both of the game picture GP and the token coin array picture MP may be displayed with 90-degree rotation. Alternatively, for instance, as shown in FIG. 15, only the game picture GP may be displayed with 90-degree rotation and the token coin array picture MP may be displayed in the same way as when being upright.

Figure 15:
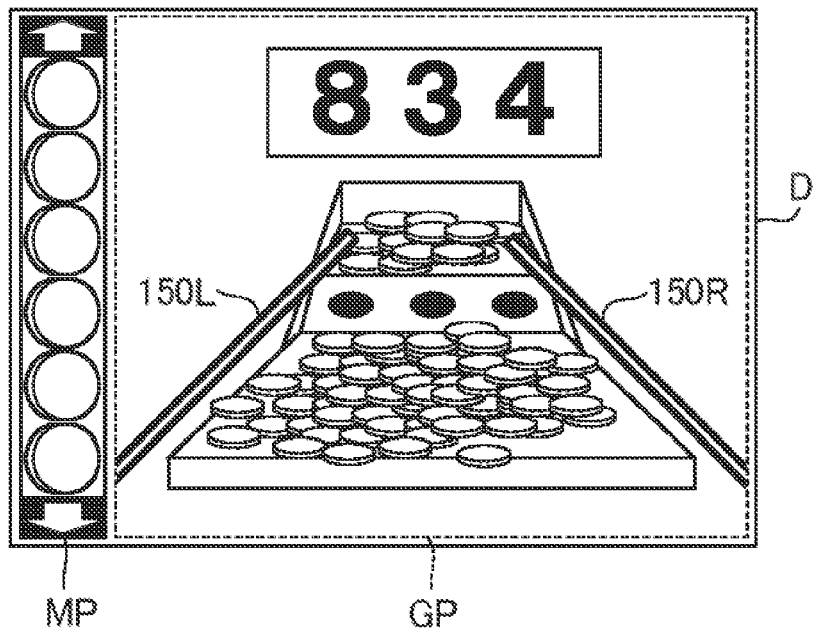
FIG. 15 is a figure that shows a display example (modification) of the pusher game.

In the case of FIG. 15, for instance, the number of the token coins M determined by the flick operation or the drag operation in an upward direction on the token coin array picture MP are fed to the field F using the left token coin feed rail 150L. The number of the token coins M determined by the flick operation or the drag operation in a downward direction on the token coin array picture MP are fed to the field F using the right token coin feed rail 150R. In the case of the pinch out operation, the number of the token coins M determined by the touch operation in the upward direction with one finger are fed using the left token coin feed rail 150L, and the number of the token coins M determined by the touch operation in the downward direction with another finger are fed using the right token coin feed rail 150R. When being sideways, if the token coin array picture MP is also displayed with 90-degree rotation, the maximum number of token coin array members of the token coin array picture MP becomes greater than that when being upright.

Modification 8

Figure 16:
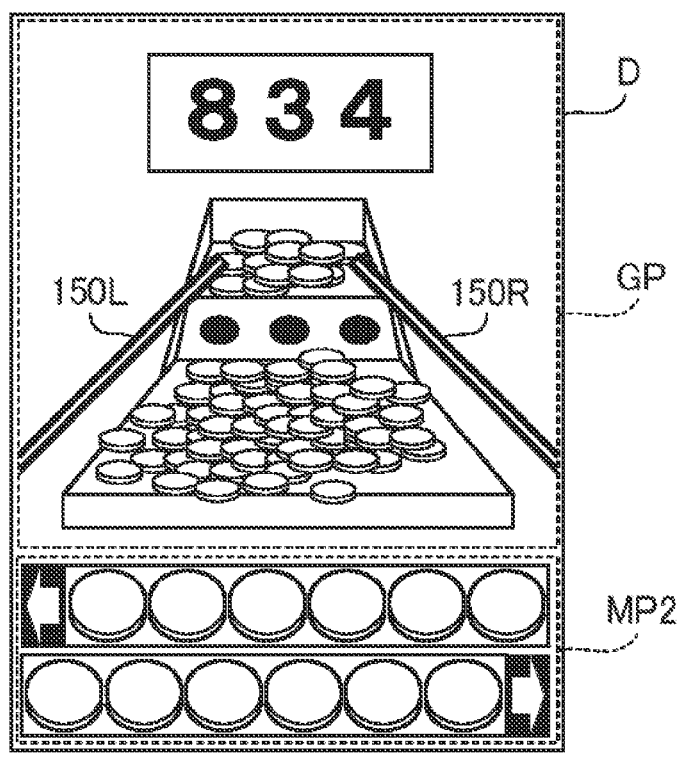
FIG. 16 is a figure that shows a display example (modification) of the pusher game.

The token coin array picture MP, MP1 may show the token coins M which are able to be fed to the field F in plural lines, rather than in a single line. For instance, the token coin array picture MP2 that shows the token coins M which are able to be fed to the field F in two lines is shown in FIG. 16. For instance, if the drag operation on the token coin array picture MP2 shown in the picture is carried out in a right direction from the second token coin M from the right side of the upper array in the figure, the CPU 10 determines to feed the eight token coins M using the right token coin feed rail 150R. If the flick operation on the token coin array picture MP2 is carried out in a left direction from the third token coin M from the right side of the lower array in the figure, the CPU 10 determines to feed the ten token coins M using the left token coin feed rail 150L. If the tap is carried out somewhere on the upper array in the token coin array picture MP2, the CPU 10 determines to feed a single token coin M using the left token coin feed rail 150L. In contrast, if the tap is carried out somewhere on the lower array in the token coin array picture MP2, the CPU 10 determines to feed a single token coin M using the right token coin feed rail 150R. In the case of the pinch out operation, for instance, in a case in which the touch operation on the token coin array picture MP2 is carried out in a left direction from the third token coin M from the right side of the upper array with one finger, and in which the touch operation is carried out in a right direction from the second token coin M from the right side of the upper array with another finger, the CPU 10 determines to feed the four token coins M using the left token coin feed rail 150L and to feed the eight token coins M using the right token coin feed rail 150R.

Modification 9

In each token coin array picture MP, MP1, MP2, a maximum number of token coin array members is not limited to six or twelve and may be equal to or greater than two. The shape of the token coin M is not limited to be circular, and it may be ellipsoidal, polygonal, etc. The pusher table 120 is not limited to giving reciprocal movement repeatedly at a constant moving speed, and may give reciprocal movement while changing its moving speed. The pusher table 120 may have a top surface in which the token coins M cannot be fed thereon. In this case, the field F consists of the top surface of the main table 110.

Modification 10

The video game apparatus according to the present invention may be an electronic device with a touch input function, for instance, a tablet computer, a notebook personal computer, a PDA, a handheld gaming device, etc. Alternatively, the video game apparatus according to the present invention may be constructed with a main unit of a personal computer and a display with a touch panel, or be constructed with a main unit of a home-use game console and a display with a touch panel. The touch panel 70 may be a resistance film type, a capacitive type (surface capacitive type), an electromagnetic induction type, a surface acoustic wave type, an infrared type, and so on. The touch operation may be carried out using a dedicated touch pen or the like.

DESCRIPTION OF REFERENCE NUMERALS

1 . . . smartphone, D . . . viewing area, 10 . . . CPU, 20 . . . ROM, 30 . . . RAM, 40 . . . phone call processor, 50 . . . communication unit, 60 . . . display, 70 . . . touch panel, 80 . . . storage, 90 . . . game software, 95 . . . physics calculation engine, M (M') . . . token coin, F (F') . . . field, 110 (110') . . . main table, EA (EA') . . . valid side, EB (EB') . . . invalid side, 120 (120') . . . pusher table, 125 (125') . . . token coin checker, 130' . . . lottery figure viewing unit, 130 . . . lottery figure viewing area, 140' . . . token coin supplier, 150 (150', 150L, 150R) . . . token coin feed rail, 160 (160') . . . wall surface, GP . . . game picture, MP (MP1, MP2) . . . token coin array picture, CF . . . central area, 170L, 170R . . . token coin feed slot.

The invention claimed is:
1. A video game apparatus for determining a number of feeding token coin to be applied in a pusher game by a video game apparatus, the pusher game played by feeding a token coin to a field provided with a pusher table on which plural token coins are placed and that gives reciprocal movement, comprising:
 a touch screen display;
 a computer processor at the video game apparatus, the computer processor coupled to a computer storage and programmed to:
  generate game picture display data for displaying a game picture that shows conditions of the plural token coins on the field and the pusher table in a viewing area of the touch screen display;
  generate token coin array display data for displaying a token coin array picture that shows in line plural token coins which are able to be fed to the field in the viewing area of the touch screen display; and
  detect one or more positions of one or more touch operations on the viewing area of the touch screen display;
  calculate a number of token coins to be fed to the field out of the plural token coins which are able to be fed based on the one or more positions of the one or more touch operations on the token coin array picture; and
  execute a game operation of the pusher game by feeing the calculated number of token coins,
 wherein the computer processor is further configured to determine a selection type based on the manner of the one or more touch operations on the touch screen display,
 wherein, when the one or more positions of the one or more touch operations lies on the token coin array picture and when the selection type of the touch operation is a flick or a drag in which a touch position moves toward a predetermined one direction of array directions of the plural token coins in the token coin array picture, the computer processor executes the pusher game by feeding all token coins that are located on a side toward the predetermined one direction from the one or more positions of the one or more touch operations on the token coin array picture, and
 wherein, when the one or more positions of the one or more touch operations detected by the detector lies on the token coin array picture and when the selection type of the one or more touch operations is a tap, the computer processor executes the pusher game by feeding one token coin to the field.

2. The video game apparatus according to claim 1, wherein the computer processor is further configured to determine a selection type based on the manner of the one or more touch operations on the touch screen display, and wherein, when two positions of two touch operations, among the one or more positions of the one or more touch operations, lie on the token coin array picture and when the selection type of the two touch operations is a pinch out in which touch positions move toward both of array directions of the plural token coins in the token coin array picture, one of the two touch operations on the two positions being a first touch operation and the other of the two touch operations being a second touch operation, the computer processor executes the pusher game by feeding on the field all token coins that are located on a side toward a moving direction of the touch position of the first touch operation from the position of the first touch operation on the token coin array picture and all token coins that are located on a side toward a moving direction of the touch position of the second touch operation from the position of the second touch operation on the token coin array picture.

3. The video game apparatus according to claim 1, wherein the computer processor further measures moving speed of the touch position and determines feed speed of a token coin to be fed to the field based on the moving speed being measured.

4. The video game apparatus according to claim 3, wherein the computer processor is further configured to calculate respective positions of the plural token coins on the field by executing a simulation based on physics calculations, and calculate a position of the token coin to be fed on the field using the feed speed as one of parameters.

5. The video game apparatus according to claim 1, the computer processor is further configured to generate a feeding position picture data for displaying a feeding position picture that shows a feeding position from which a token coin is fed to the field in the viewing area of the touch screen display, wherein, when the one or more positions of the one or more touch operations lies on the feeding position picture, the computer processor changes a display position of the feeding position picture and the feeding position based on the touch operation.

6. A video game apparatus for determining a number of feeding token coin to be applied in a pusher game by a video game apparatus, the pusher game played by feeding a token coin to a field provided with a pusher table on which plural token coins are placed and that gives reciprocal movement, comprising:

a touch screen display;

a computer processor at the video game apparatus, the computer processor coupled to a computer storage and programmed to:

generate game picture display data for displaying a game picture that shows conditions of the plural token coins on the field and the pusher table in a viewing area of the touch screen display;

generate token coin array display data for displaying a token coin array picture that shows in line plural token coins which are able to be fed to the field in the viewing area of the touch screen display; and detect one or more positions of one or more touch operations on the viewing area of the touch screen display;

calculate a number of token coins to be fed to the field out of the plural token coins which are able to be fed based on the one or more positions of the one or more touch operations on the token coin array picture; and execute a game operation of the pusher game by feeding the calculated number of token coins, wherein the computer processor is further configured to determine a selection type based on the manner of the one or more touch operations on the touch screen display, wherein, when the one or more positions of the one or more touch operations lies on the token coin array picture and when the selection type of the touch operation is a flick or a drag in which a touch position moves toward either one of array directions of the plural token coins in the token coin array picture, the computer processor executes the pusher game by feeding all token coins that are located on a side toward a moving direction of the touch position from the one or more positions of the one or more touch operations on the token coin array picture, wherein the pusher game is executed to include two feeding positions from which a token coin is fed to the field, and wherein, when the one or more positions of the one or more touch operations lies on the token coin array picture and when the selection type of the touch operation is a tap, the computer processor selects at least one of the feeding positions based on the one or more positions of the one or more touch operations and feeds one token coin from each of the at least one of the feeding positions being selected.

7. The video game apparatus according to claim 6, wherein a feeding position from which a token coin is fed to the field differs depending on whether the moving direction of the touch position is one of the array directions or the other of the array directions.

* * * * *